May 22, 1945.  A. M. HEWLETT  2,376,694
AUTOMATIC DIVERTER FOR SUGAR CONTAMINATED CONDENSATES
Filed Oct. 3, 1942
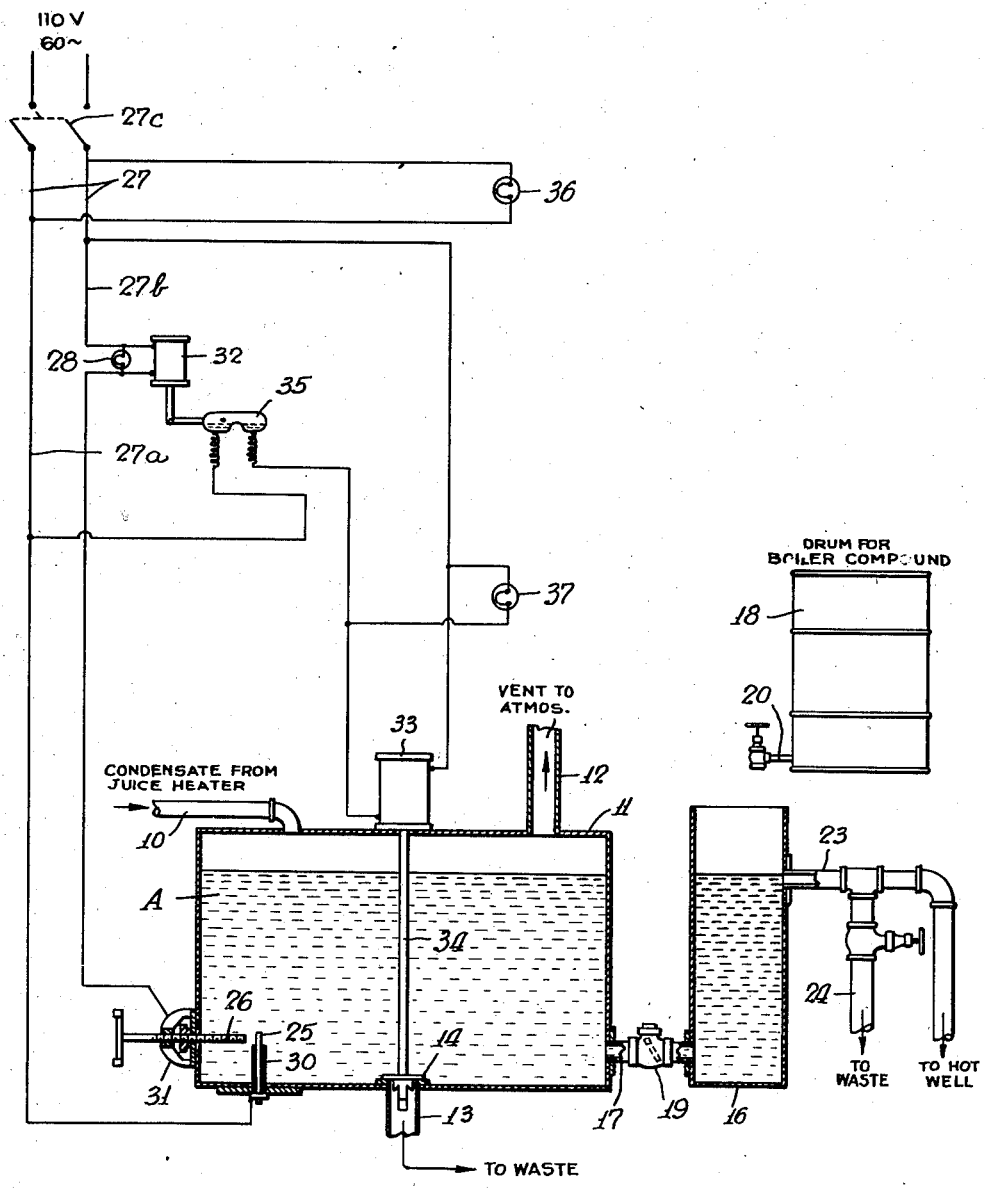
INVENTOR
Allen M. Hewlett
BY
ATTORNEYS Patented May 22, 1945

2,376,694

UNITED STATES PATENT OFFICE 2,376,694

AUTOMATIC DIVERTER FOR SUGAR CONTAMINATED CONDENSATES

Allen M. Hewlett, Haina, Hamakua, Territory of Hawaii

Application October 3, 1942, Serial No. 460,696

6 Claims. (Cl. 137—68)

In the manufacture of sugar from cane or beet juice, it is common practice to utilize the vapor from one or more stages of the evaporators to heat the juice after liming and before delivery to the clarifier or settling tanks. This results in the condensation of the vapors and permits the condensate to be used as extra distilled feed water for the boilers. It is also common in sugar mills to utilize the condensate from the second and/or succeeding stages of the evaporators for the boiler feed. By "condensate" is meant water produced by the change of state resulting when water vapor gives up its heat of vaporization, and superheat if any, to mediums in heat transfer relationship therewith, such mediums being usually the heat transfer surfaces of evaporator calandrias, heaters and surface condensers. Dangers are inherent in the use of such condensate in the boilers if it contains any sugar such as might result from leakage in the juice heater, entrainment in the vapor from the evaporators or other causes whereby sugar juice gets into the condensate.

This has been a problem of considerable importance in raw sugar mills because of the very nature of sugar. Most organic or mineral impurities in boiler feed waters are undesirable, but are not particularly harmful except over a considerable period of time or in boilers operating at high pressures and ratings. Sugar, however, is almost as dangerous as oil even in boilers that operate at the low ratings and the low pressures common to sugar mills.

Neither pure water nor a pure solution of sugar is an electrolyte, and therefore the presence of sugar in the condensate cannot be directly detected by electrolytic means. Furthermore, the passage of direct electric current through the solution is objectionable, because of the effect of electrolytic polarization.

I understand that all previous efforts to detect the presence of sugar in condensate by electrical means have ended in failure.

I have discovered a method whereby the presence of sugar in the condensate can be detected in a simple and practical manner, and such condensate as contains sugar may be diverted and prevented from entering or from returning to the feed water supply.

The juice in the heater as well as the concentrate in the evaporators contains a relatively low but relatively fixed percentage of impurities such as mineral salts or inorganic acids which are electrolytes, and even though such juice as may leak into the condensate or be entrained in the vapors from the evaporators may be a very small percentage of the condensate, and these electrolytic impurities be a far smaller percentage, I have discovered how the presence of the sugar in the condensate may be detected through the presence of these impurities which accompany the sugar.

In carrying out my invention, I provide means whereby an alternating current of relatively high voltage may pass between spaced electrodes in the condensate when such condensate contains even a relatively small amount of sugar with its accompanying much smaller amount of mineral salts and other impurities. The current being alternating instead of direct, nullifies the effect of electrolytic polarization, and the high voltage permits the passage of sufficient current to operate an indicator and/or control mechanism even when there are mere traces of the electrolytic impurities present. By the term high voltage alternating current I mean voltages in the region of 100 volts or more and frequencies such as 60 cycles, as distinguished from direct current of 6 to 25 volts such as has been used with detectors for impurities in boiler feed water. The current passed through the condensate may act through a relay or the like to effect actuation of suitable valves by which the condensate is diverted and prevented from going to the feed water supply, and to effect actuation of a signal or alarm, just so long as the condensate is being contaminated.

The valve may be reversed and the signal or alarm stopped or started automatically when the contamination ceases.

Various other objects, features and advantages of the invention will be apparent from the following particular description, and from an inspection of the accompanying drawing, diagrammatically showing a form of apparatus which embodies the present invention and which can be employed to carry out the process of the present invention.

In carrying out my improved process, the vapor from the evaporator condensed in the juice heater is delivered as a condensate through pipe 10 and may accumulate in a closed receiving tank 11, provided with a vent 12 for the escape of flash vapors and non-condensable gases. Since the temperature of the incoming condensate is not much below 212° F., most of the oxygen and ammonia in the system "flash off" in the space at the top of the tank 11, and escape to the atmosphere through the vent 12. An outlet 13 in the bottom of the tank 11 controlled by a valve 14 serves as a means by which the contents of the tank 11 may be dumped to waste or diverted for any desired purpose.

An open top auxiliary receiving tank 16 is connected in series with the main receiving tank 11 by means of a pipe 17 having a check valve 19 to prevent return flow from said auxiliary receiving tank 16 to said main receiving tank 11. This auxiliary receiving tank 16 serves as a means by which chemicals may be introduced into the condensate before delivery to the boiler, without affecting the electrolytic condition of the liquid in the main tank 11. If it is desired to modify the character of this portion of the boiler feed water, there may be provided a drum or vessel 18 containing boiler compound solution and having a valved discharge pipe 20 directly over the open top of the auxiliary tank 16 whereby chemicals may be introduced into the condensate in said tank. The liquid in the auxiliary tank 18 is maintained at constant level by an overflow pipe 23 leading to a hot well. A valved branch pipe 24 connected to the overflow pipe 23 facilitates collection of check samples, and may also serve as a means by which the overflow may be drained to waste.

For determining the presence of sugar in the condensate, there is provided a pair of normally fixed but relatively movable electrodes 25 and 26, connected in the circuit of a current supply line 27, and made of suitable electrode material such as brass. One of these electrodes 25 is shown as being fixed in an insulating sleeve 30 extending through the wall of the tank 11 near the bottom of the latter. This electrode projects beyond said sleeve so that the terminal portion is exposed to the liquid in said tank. The other electrode 26 extends at right angles to the first mentioned electrode and is movable endwise towards or away from the exposed end of the latter. Merely as an example of the many ways in which the electrode 26 may be mounted, it is shown as either connected to or forming a part of a handled member insulated from the tank 11 and threaded in a bonnet or bracket 31 connected to the outside of the tank.

The electrodes 25 and 26 are connected to opposite mains of a high voltage alternating current line 27 such as one of 110 volt 60 cycles, as illustrated. One supply line 27a is connected to the electrode 25, while the other line 27b is electrically connected to the other electrode 26 through the coil of a small solenoid 32 in series with said electrode 26. A small signal light 28 is connected in series with the electrodes 25 and 26, and in parallel with the solenoid 32, so that it glows dimly when the main switch 27c is closed, but becomes brighter as the conductivity of the solution in tank 11 increases. When the solenoid 32 finally becomes sufficiently energized to pull up its plunger, the signal light 28 glows very brightly.

The solenoid 32 acts to control a branch circuit in which there is a motor for operating the waste valve 14 at the bottom of the tank 11. This motor may be of any suitable type and may activate the valve 14 by any suitable operating mechanism. Merely as an example, this is shown as a powerful 110 volt solenoid 33 having its plunger connected to the waste valve 14 by a thruster rod 34. This solenoid 33 is mounted in a secondary circuit across the supply lines 27 in parallel with the electrodes 25 and 26 and provided with a suitable switch 35 actuated by the solenoid 32 so that the circuit of the valve actuating solenoid 33 is closed when the conductivity of the liquid in the tank 11 exceeds a predetermined value. This switch 35 is shown as an example of the mercoid type, in which a mercury tube has its contacts open when the tube is horizontal and closed when the tube is tilted.

As will be apparent, the electrodes 25 and 26 are completely immersed in the hot condensate and adjustment may be made by screwing the electrode 26 slowly inwardly until a point is reached at which the resistance of the primary circuit of the solenoid 32 is sufficiently low to permit passage of a current of such magnitude that the plunger of said solenoid begins to lift slightly. Then the electrode is retracted just enough to allow the plunger of the solenoid 32 to return to rest. The condensate is then tested chemically for traces of sugar. If no trace or only slight traces are found, the setting will be considered satisfactory. The electrodes 25 and 26 should desirably be separated by about one-eighth of an inch or less when set as described. With this setting of the electrodes, the parts will remain as shown and the secondary circuit will remain open, so long as the conductivity of the condensate does not exceed a predetermined value determined by said setting and said condensate is substantially free of sugar.

Immediately upon contamination with cane or beet juice or concentrate from leakage, entrainment or other causes, the electrolytic impurities in said juice or concentrate increase the conductivity of the liquid between the two electrodes 25 and 26, thereby permitting more current to pass through the coil of the solenoid 32. When this conductivity reaches a certain degree, the solenoid 32 will be energized sufficiently to tilt the switch 35 into circuit closing position, thereby energizing the valve actuating solenoid 33. This causes the opening of the valve 14 at the bottom of the tank 11, and the resultant dumping of the contaminated condensate to waste. The increased conductivity across the electrodes 25 and 26 will also cause signal light 28 to glow more brightly.

As soon as the level of liquid in the tank gets below the shoulder of the insulating sleeve 30 on the fixed electrode 25, all circuits are opened and the dump valve 14 closed. The receiving tank 11 may then refill, if the contamination has ceased, but if the refilling condensate is still contaminated, the above series of events are repeated, until the condensate delivered to the tank is substantially free of sugar. In the event of a tube leak, the process will be repeated until the resultant flashing of the pilot light is noticed by the operator. The operator can then by-pass the entire system until the leak has been repaired.

More precise settings of the electrodes in the condensate may, if desired, be determined by the use of an A. C. Wheatstone bridge and a galvanometer with a properly graduated dial.

Also, the solenoid 33 constitutes only one form of motor and the dump valve 14 may be of any suitable type. Such a motor, for instance, may constitute part of a G. E. Thrustor device controlled from the switch 35.

In addition to the signal lamp 28, a remotely located lamp 36 of suitable voltage may be connected across the mains 27 to indicate failure of power or the blowing of the fuses. Also, in addition to the signal lamp 28 or in place thereof, a remotely located lamp 37 of suitable voltage may be connected in parallel with the solenoid 33 to indicate dumping operations.

As many changes can be made in the above method and apparatus, and many apparently widely different embodiments of this invention can be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. An apparatus for controlling the flow of condensate from an evaporator for sugar solutions to the source of feed water for a boiler, which includes a tank having a condensate inlet, an outlet for the outflow of condensate from the tank, means for maintaining a normal substantially constant liquid level in said tank, a normally closed dump valve at the bottom of said tank for condensate contaminated with sugar, a source of alternating current, a pair of spaced electrodes in said tank below said predetermined level, and means for opening said dump valve when the condensate becomes conductive due to impurities accompanying the sugar contaminating said condensate, and by current flow between said electrodes from said source, said valve being constructed and arranged to automatically close when the liquid level in the tank gets below one of said electrodes.

2. An apparatus for controlling the flow of condensate from the condensers of sugar evaporators, including a tank having a pair of electrodes, a permanently open outlet for uncontaminated condensate, means associated with said outlet for maintaining a substantially constant liquid level in said tank above said electrodes, an outlet from said tank below said level, a normally closed valve for controlling said second mentioned outlet, and operating means for opening said valve when the condensate between said electrodes is conductive due to impurities accompanying the sugar contaminating said condensate, and current may flow between said electrodes, said operating means being constructed and arranged so as to close said valve when said current flow ceases.

3. An apparatus for controlling the flow of condensate from the condensers of sugar evaporators, including a tank having a pair of electrodes, a permanently open outlet for uncontaminated condensate, means associated with said outlet for maintaining a substantially constant liquid level in said tank above said electrodes, an outlet from said tank below said level, a valve normally biased to closed position for controlling said second mentioned outlet, and operating means for opening said valve when the condensate between said electrodes is conductive due to impurities accompanying the sugar contaminating said condensate and holding it open only until the liquid level in said tank gets below one of said electrodes.

4. An apparatus of the character described, including a tank having an inlet and an outlet for the continuous flow therethrough of condensate from the evaporators of a sugar mill, said outlet being so positioned as to maintain a substantially constant liquid level in said apparatus, said tank having a second outlet below said first mentioned outlet, a valve for said second outlet and normally held closed by the action of gravity, a high voltage alternating current circuit having a pair of spaced electrodes extending into the condensate in said tank, an electro-magnetic device in said circuit and operable when the electrical conductivity of the condensate between said electrodes exceeds a predetermined value, and means operable when said electro-magnetic device is operated for opening said valve against the action of gravity and holding it open until the liquid level in said tank drops below at least one of said electrodes.

5. An apparatus for controlling the flow of condensate from an evaporator for sugar solutions to the source of feed water for a boiler, which includes a tank having a condensate inlet, an outlet for the outflow of condensate from the tank, so positioned that the condensate will flow therefrom only when the liquid level is above a predetermined level, a normally closed dump valve at the bottom of said tank for condensate contaminated with sugar, a source of alternating current, a pair of spaced electrodes in said tank below said predetermined level, and means for opening said dump valve when the condensate becomes conductive due to impurities accompanying the sugar contaminating said condensate and by current flow between said electrodes from said source, said valve being so constructed as to automatically close when the liquid level in the tank gets below one of said electrodes.

6. An apparatus for controlling the flow of condensate from an evaporator for sugar solutions to the source of feed water for a boiler, which includes a tank having an inlet and an outlet for the normal continuous flow of condensate through the tank to said source of feed water, means for maintaining a normal substantially constant liquid level during said continuous flow, an alternating electric current circuit including a pair of electrodes in said tank below said normal liquid level, a second outlet at the bottom of said tank, a valve normally closing said second outlet, and means actuated by the flow of current between said electrodes when said condensate becomes contaminated by sugar and is thereby rendered conductive by impurities in the sugar, for opening said valve, said valve being constructed to close when the flow of current is terminated.

ALLEN M. HEWLETT.